United States Patent
Kalm et al.

(10) Patent No.: US 11,535,450 B1
(45) Date of Patent: Dec. 27, 2022

(54) ITEM LOADING BY CHAMBER BOUNDED BY SYNCHRONIZED CONVEYING SURFACES

(71) Applicant: Amazon Technologies, Inc., Seattle, WA (US)

(72) Inventors: William Scott Kalm, Seattle, WA (US); Kevin Senh Ly, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 16/703,755

(22) Filed: Dec. 4, 2019

(51) Int. Cl.
*B65G 1/12* (2006.01)
*B65G 47/38* (2006.01)
*B65G 47/252* (2006.01)
*B65G 1/137* (2006.01)
*B65G 1/08* (2006.01)

(52) U.S. Cl.
CPC ............. *B65G 1/12* (2013.01); *B65G 47/252* (2013.01); *B65G 47/38* (2013.01); *B65G 1/08* (2013.01); *B65G 1/1376* (2013.01)

(58) Field of Classification Search
CPC ................................. B65G 15/14; B65G 1/12
See application file for complete search history.

(56) References Cited

U.S. PATENT DOCUMENTS

| | | | |
|---|---|---|---|
| 2,626,702 A | 1/1953 | Basus | |
| 2,918,164 A | 12/1959 | Austin et al. | |
| 3,155,183 A | 11/1964 | Bradford | |
| 3,306,426 A | 2/1967 | Arnold et al. | |
| 4,464,884 A * | 8/1984 | Franks | B65G 15/14 53/137.1 |
| 4,856,956 A * | 8/1989 | Zur | B65G 1/0435 414/280 |
| 5,915,525 A * | 6/1999 | Baker | H05K 13/0061 198/604 |
| 5,990,437 A | 11/1999 | Coutant et al. | |
| 6,082,522 A | 7/2000 | Polling | |
| 6,247,577 B1 | 6/2001 | Dahlgrun et al. | |

(Continued)

OTHER PUBLICATIONS

U.S. Appl. No. 16/831,431, "Automatic Rotary Inserting Machine", Mar. 26, 2020, 37 pages.

(Continued)

*Primary Examiner* — Jonathan Snelting
(74) *Attorney, Agent, or Firm* — Kilpatrick Townsend & Stockton LLP

(57) ABSTRACT

An insertion system (e.g., in a warehouse or other item-fulfillment environment) can include a chassis. A bottom conveying surface, a first side conveying surface, and a second side conveying surface may be fastened to the chassis respectively along the chassis's bottom face, first lateral face, and second lateral face. A chamber may be bounded by the conveying surfaces and by a rear wall defined at least in part by the front face of the chassis. A linear actuator coupled with the chassis may move the chassis from a home position and toward an extended position to advance the bottom conveying surface, the first side conveying surface, and the second side conveying surface along with the rear wall of the chamber to decrease a size of the chamber and advance contents of the chamber in a depth direction toward a receiving zone.

12 Claims, 17 Drawing Sheets

(56) References Cited

U.S. PATENT DOCUMENTS

| | | | |
|---|---|---|---|
| 6,460,681 B1 | 10/2002 | Coutant et al. | |
| 7,334,676 B1 * | 2/2008 | McGourin | B65G 15/14 |
| | | | 198/626.6 |
| 7,392,635 B2 | 7/2008 | May et al. | |
| 7,798,308 B2 * | 9/2010 | Ranger | B65G 47/2445 |
| | | | 198/623 |
| 8,739,959 B2 | 6/2014 | Breil | |
| 9,284,132 B2 | 3/2016 | Hawighorst et al. | |
| 9,884,732 B2 | 2/2018 | Antoniazzi et al. | |
| 10,611,571 B2 | 4/2020 | Bouche et al. | |
| 10,618,732 B2 * | 4/2020 | Iwata | B65G 1/137 |
| 10,994,939 B2 * | 5/2021 | Garbagnati | B65G 17/26 |
| 11,111,084 B1 | 9/2021 | Kalm et al. | |
| 2005/0039419 A1 | 2/2005 | Griggs et al. | |
| 2005/0061614 A1 | 3/2005 | Balk et al. | |
| 2020/0062514 A1 | 2/2020 | Dugat | |

OTHER PUBLICATIONS

U.S. Appl. No. 16/703,735, U.S. Patent Application, filed Dec. 4, 2019, Titled: Automatic Tray Dispensing.

* cited by examiner

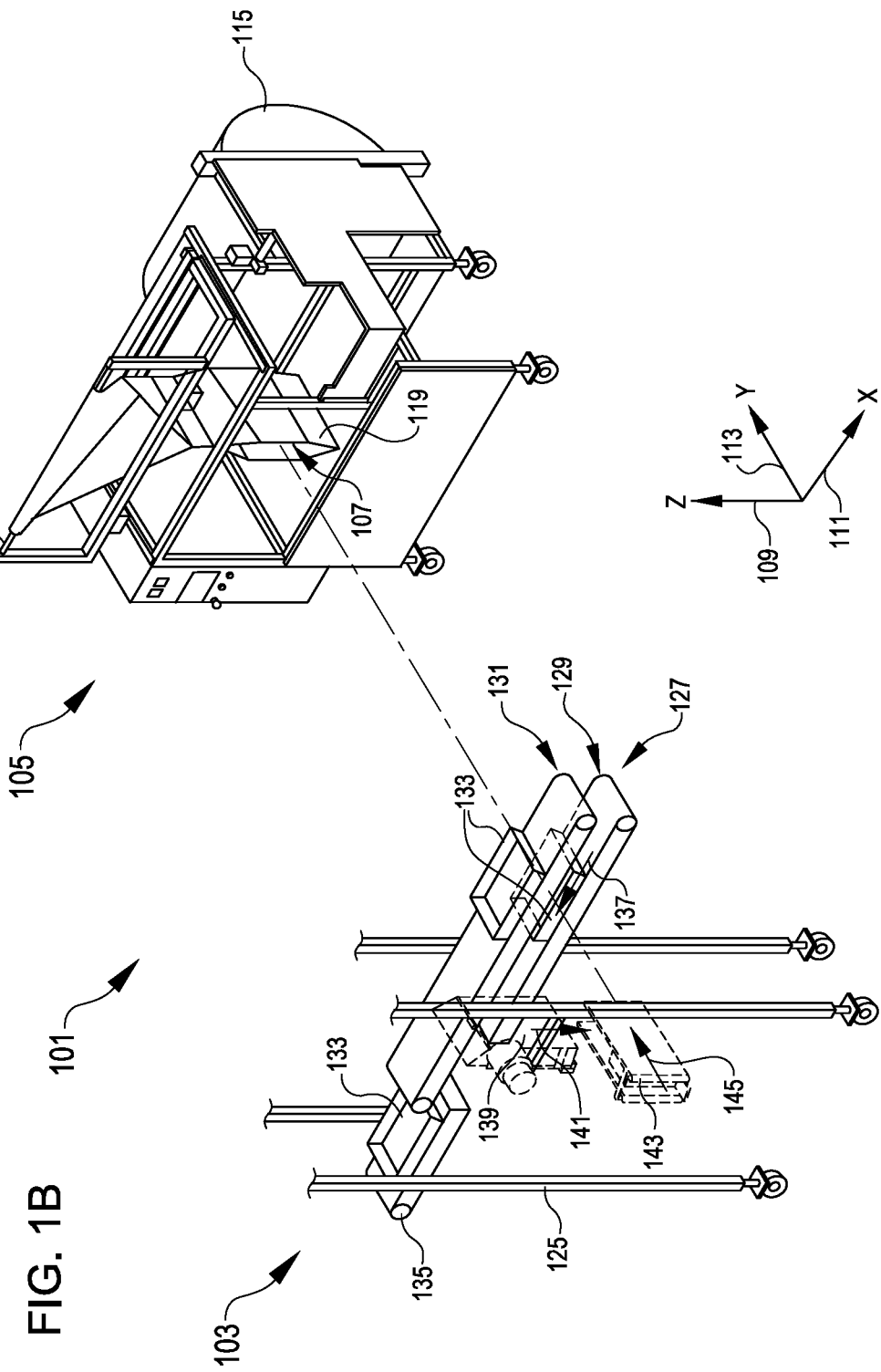

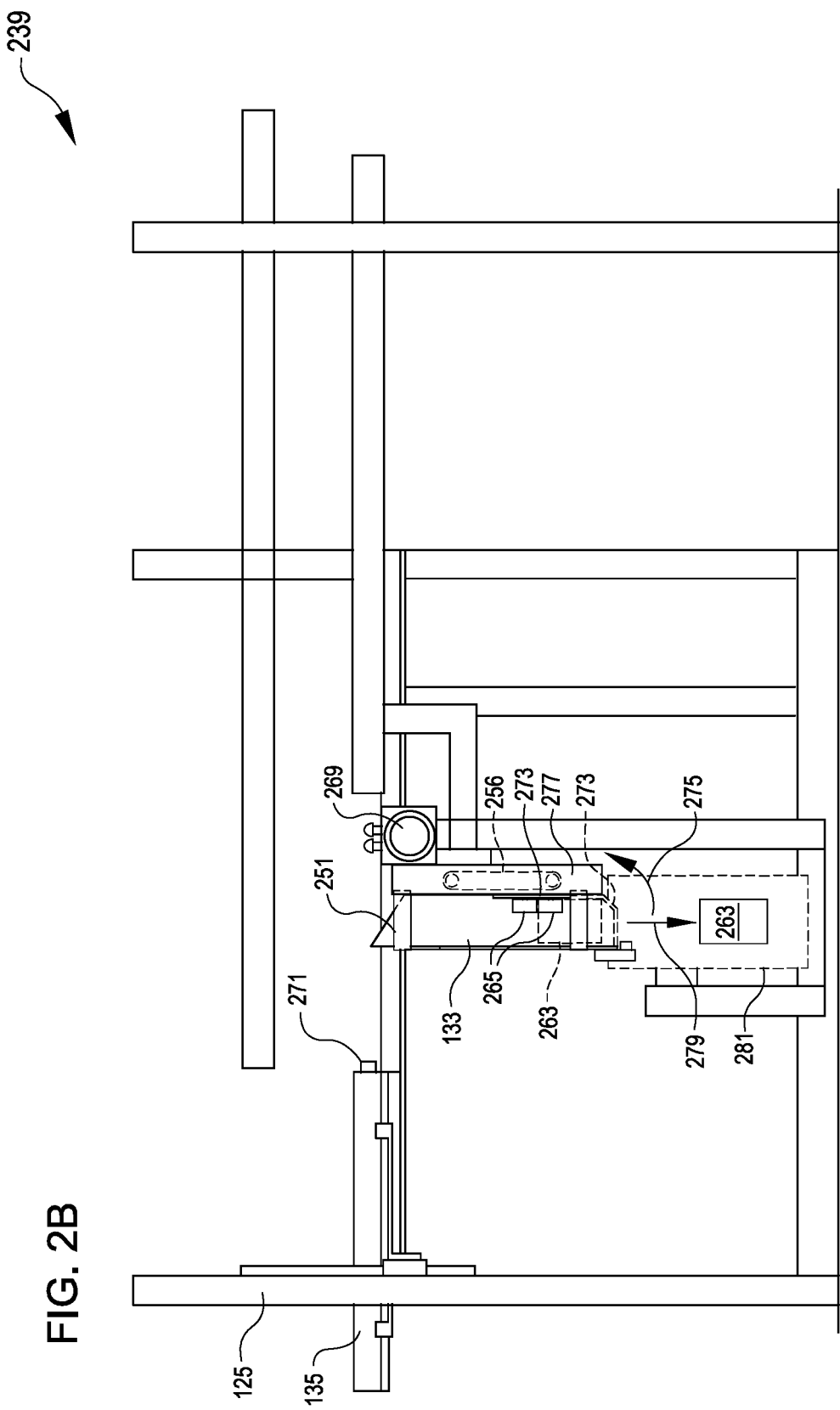

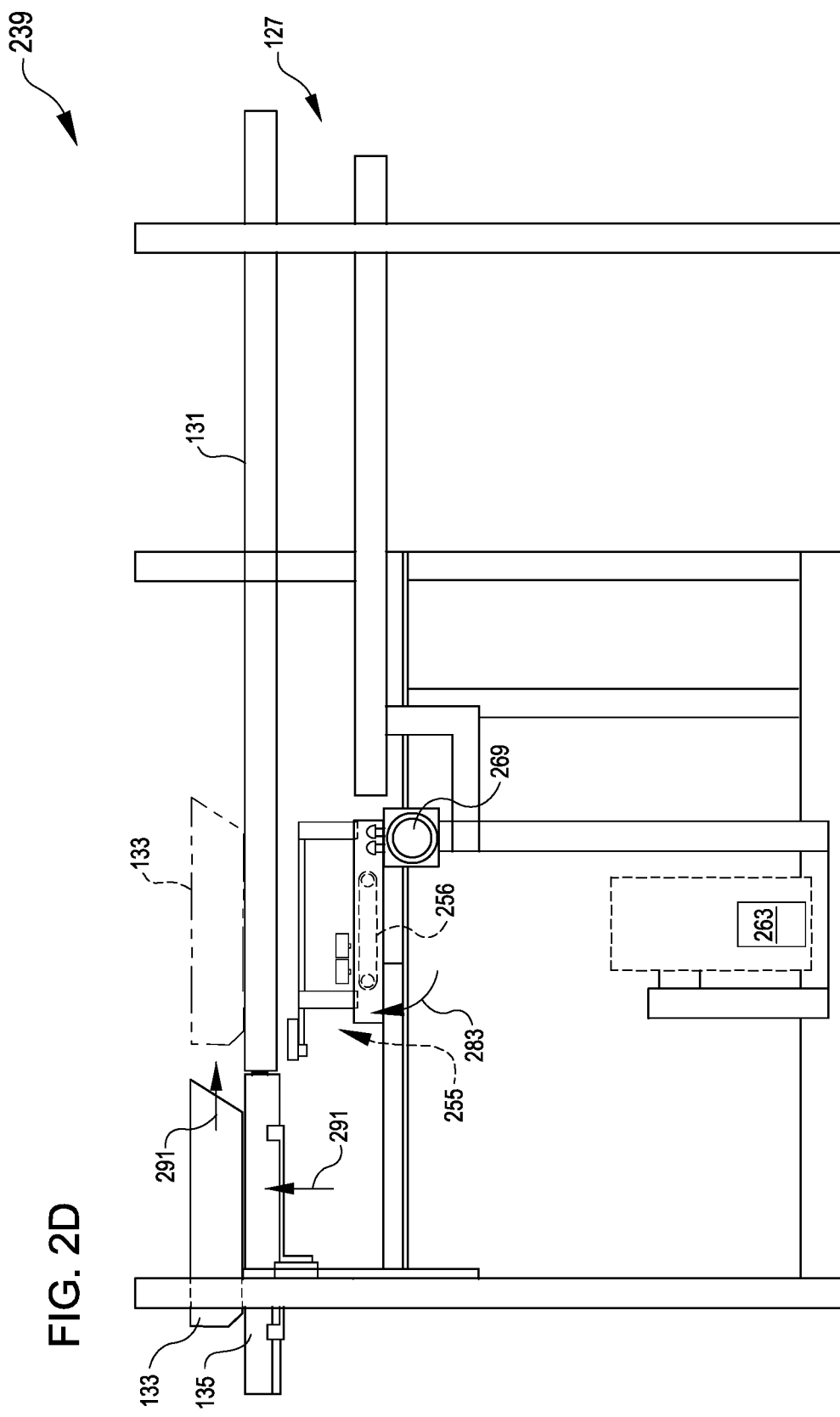

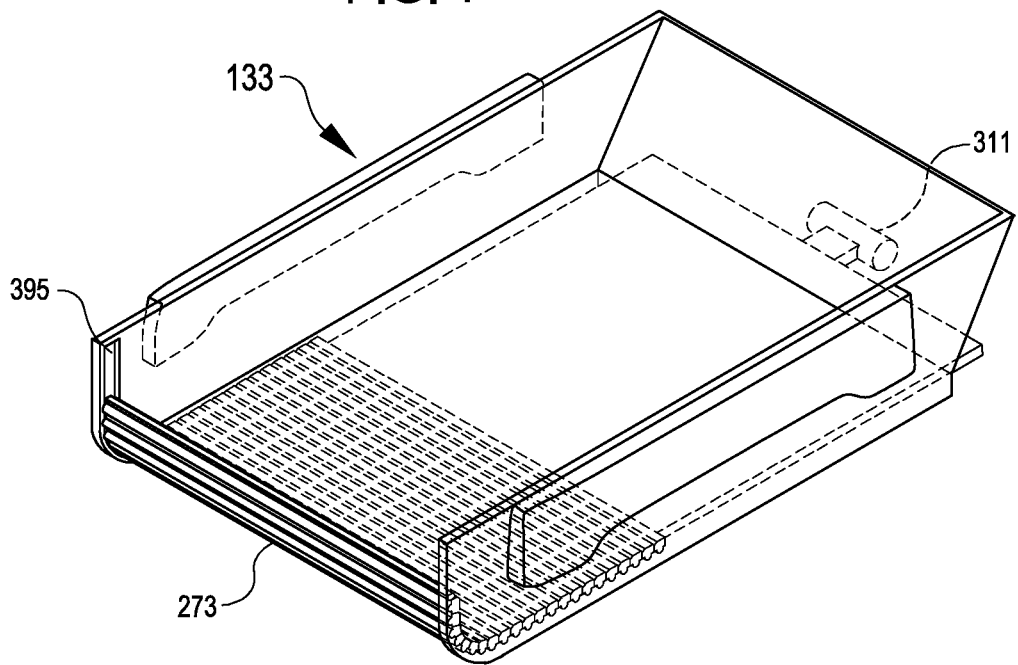
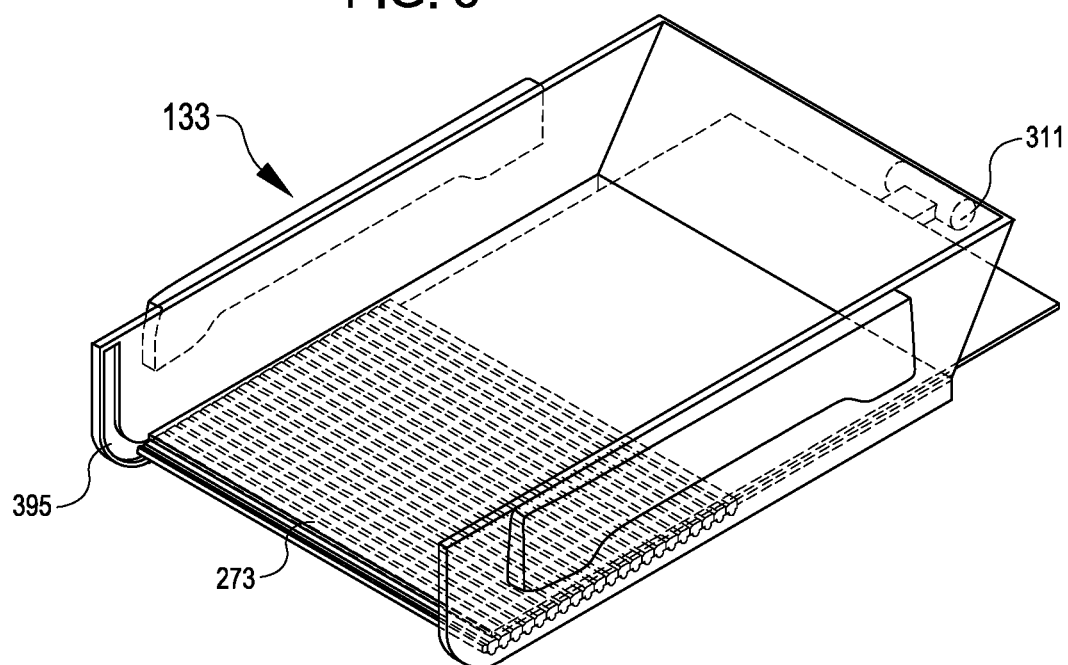

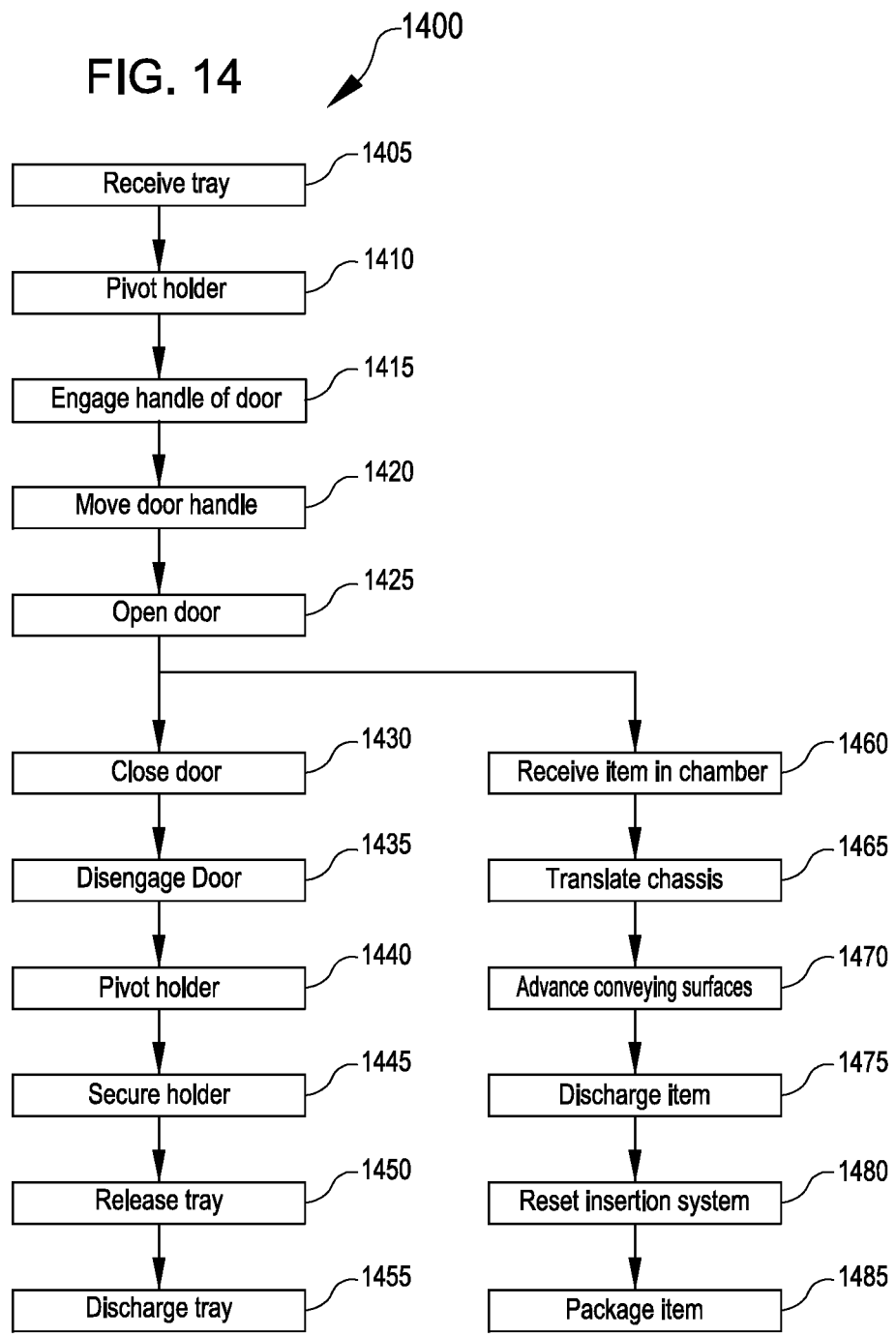

ITEM LOADING BY CHAMBER BOUNDED BY SYNCHRONIZED CONVEYING SURFACES

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become nontrivial. In inventory systems tasked with responding to large numbers of diverse inventory requests, inefficient utilization of system resources, including space and equipment, can result in lower throughput, unacceptably long response times, an ever-increasing backlog of unfinished tasks, and, in general, poor system performance. Speed, reliability, scalability, and other criteria may be pertinent areas for improvement, notwithstanding that a gain in one area may often yield a corresponding tradeoff in another.

BRIEF DESCRIPTION OF THE DRAWINGS

Various embodiments in accordance with the present disclosure will be described with reference to the drawings, in which:

FIGS. 1A and 1B are perspective views showing an inventory loading system, according to various embodiments;

FIGS. 2A-2D illustrate a side view of an example of a dispensing system that may be utilized in the inventory loading system of FIG. 1 and show various examples of positions of a tray at differing stages of use, according to various embodiments;

FIGS. 4 and 5 illustrate perspective views the tray of FIG. 3 with the door respectively in partially open and fully opened states, according to various embodiments;

FIG. 14 is a flowchart illustrating a process that may be performed with respect to the inventory loading system of FIG. 1 and/or other elements described herein, according to various embodiments.

DETAILED DESCRIPTION

Figure 1A:
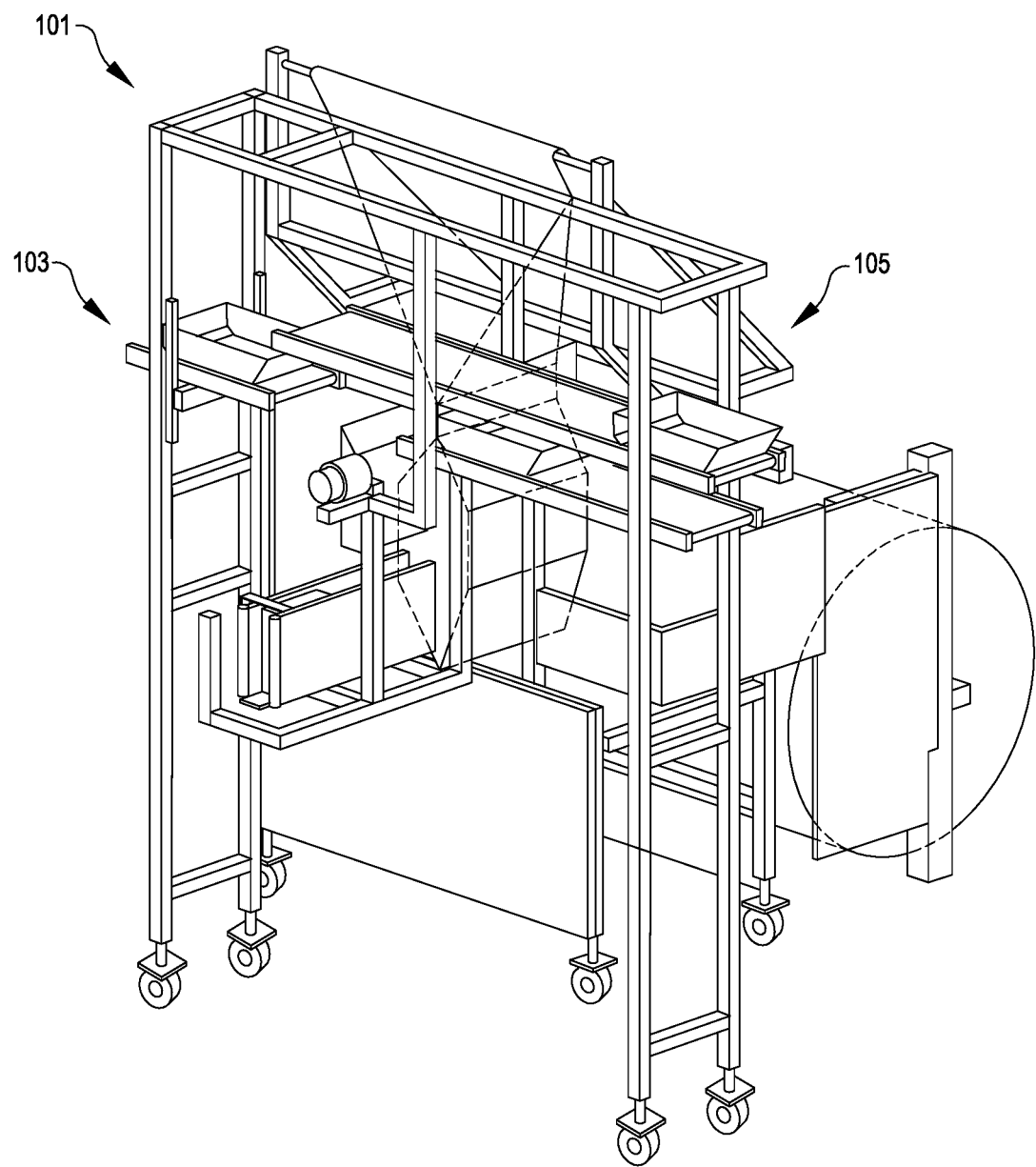

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein may pertain to inventory management systems. Disclosed components may facilitate automatic loading of items into a front-facing opening of a packaging system or other relevant receiving zone. In some embodiments, systems may correspond to add-on machines or components that can facilitate loading of existing machines, although the disclosure herein is not so limited.

In some embodiments, a packaging machine may arrange packaging to provide or present an opening that faces in a forward direction. Such an orientation may present challenges to automated loading of such an arrangement. In some examples, a frame bearing suitable subcomponents can be positioned in an appropriate position relative to the packaging machine to allow for automated loading into the difficult-to-approach front-facing loading zone of the packaging machine.

In some embodiments, an inventory loading system can include a frame that supports conveyor belts that allow trays to be carried in a lengthwise direction along the frame. For example, the trays may be carried in an inbound direction from a first (e.g., a rightward) end and toward a second (e.g., leftward) end, travel up an elevator or other suitable lift at the second end, and travel along a subsequent level of conveyors to travel in an outbound direction of the frame. Between switching from inbound to outbound, the tray may engage a dispensing system that pivots the tray downward into an orientation that facilitates unloading.

In the downwardly pivoted position, a sliding door at the front of the tray can be actuated (e.g., by a hook or other suitable mechanism being brought into engagement with a handle of the door to pull the door open). Opening the door can allow items to drop out of the front end of the tray into an assembly below the dispensing system. Once emptied, the tray can be pivoted back in line with the conveyor system to allow the tray to be transported in the outbound direction.

Meanwhile, the items dropped from the tray may be received in a chamber that may facilitate inserting the items into the target receiving zone in a front-back direction (e.g., as opposed to the up-down direction of the dispenser, or the left-right direction of the conveyor belts). The chamber can include features that reduce a risk of plastic bags or other wrapping or packaging becoming tangled among surfaces that move relative one to another. For example, the chamber at a rear end can be defined by a front face of a block-like chassis. The sides and bottom of the chassis can be fastened to belts that extend forward of the front face of the chassis and define other sides of the chamber. When an item is received in the chamber, the chassis can be advanced to also advance the belts and thus move the item received in the chamber with all sides around it moving in synchronized movement without relative motion among the respective components. When the item has been dropped off the end of the belts by the forward motion of the belts, the chassis may continue forward past the ends of the belts in order to push the item farther in the forward direction into the receiving zone.

Referring now to the drawings, in which like names and/or reference numbers may refer to like elements across different drawings, FIG. 1A illustrates an inventory management system 101. The inventory management system 101 can include an inventory loading system 103, for example, which may facilitate loading relative to a packaging system 105 that may interact with or be included within the inventory management system 101.

FIG. 1B shows elements of the inventory management system 101 separated for ease of viewing respective elements and interaction thereof. The inventory loading system 103 may facilitate loading relative to a receiving zone 105, for example. The receiving zone 107 is shown in FIG. 1B as a zone defined by the packaging system 105. The receiving zone 107, however is not so limited, and may additionally or alternatively correspond to a receiving zone 107 of another machine or system other than that depicted.

Various elements of the inventory management system 101 may be defined in terms of different directions. For example, in FIG. 1 an altitude direction 109, a length direction 111, and a depth direction 113 are graphically represented by axes extending in respectively in the Z, X, and Y directions. In some examples, the respective directions may be orthogonal to one another. In some examples, the altitude direction 109 may correspond to an up-down direction (e.g., vertical), the length direction 111 may correspond to a left-right direction (e.g., a longitudinal direction or a first horizontal direction), and the depth direction 113 may correspond to front-back direction (e.g., a transverse direction, a lateral direction, and/or a second horizontal direction).

The packaging system 105 may correspond to a vertical packaging and/or feeding machine, e.g., which may be capable of manipulating one or more sheets of paper, plastic, and/or other packaging material to form a suitable receptacle for shipping or other transport of items. In the example depicted in FIG. 1, the packaging system 105 includes a roll 115 of packaging that can be folded or otherwise manipulated by passage through suitable members 117 to form an envelope 119 that is sealed along the top, bottom, and rear edges yet open along a front edge to define an entry opening into the receiving zone 107. The entry opening may be oriented so that the receiving zone 107 may allow insertion or be accessible through the entry opening by movement in the depth direction 113. Boundaries of the opening may be defined at least in part by face that extends in the altitude direction 109 and/or the length direction 111.

In FIG. 1, the inventory loading system 103 includes a support frame 125 that may support other elements of the inventory loading system 103. The support frame 125 may correspond to metal or other bars or structures suitable for supporting and positioning other elements. The support frame 125 may be utilized to position other components relative to the packaging system 105, for example.

The inventory loading system 103 can include a tray transport system 127. The tray transport system 127 can include any suitable combination of one or more inbound conveyors 129 and outbound conveyors 131, which may each include similar or different belts, rollers, or other suitable structure for transporting trays 133. In FIG. 1, the inbound conveyors 129 are positioned below the outbound conveyors 131 in the altitude direction 109, although other arrangements are possible. A suitable elevator or lift 135 may facilitate transition from the inbound conveyor 129 to the outbound conveyor 131. A total of three trays 133 are shown by way of example in FIG. 1, although any number including one or more than one may be utilized within the inventory loading system 103.

In use, a tray 133 being transported by the inbound conveyor 129 (e.g., as illustrated by arrow 137) may interact with a dispensing system 139. Suitable examples of elements for the dispensing system 139 are described in more detail herein, such as with respect to FIGS. 2-8, although the dispensing system 139 may additionally or alternatively utilize any suitable hatch, dumper, or other structure for transitioning contents of the tray 133 from movement in the length direction 111 and into movement in the altitude direction 109 (e.g., as illustrated by arrow 141).

The dispensing system 139 may dispense contents of the tray 133 into a suitable structure of an insertion system 143. Suitable examples of elements for the insertion system are described in more detail herein, such as with respect to FIGS. 9-11, although the insertion system 143 may utilize any suitable pusher, puller, or other structure to transition contents of the tray 133 from movement in the altitude direction 109 to movement in the depth direction 113 (e.g., as illustrated by arrow 145).

In use, the insertion system 143 may insert contents from the tray 133 into the receiving zone 107, which as noted earlier, may correspond to a particular zone of the packaging system 105. Thus, although the insertion system 143 is shown separated from the receiving zone 107 by a dot-dash line for ease of viewing, in use, respective elements may be positioned adjacent one another or otherwise in suitable proximity for transition of contents from one to the other.

Figure 2A:
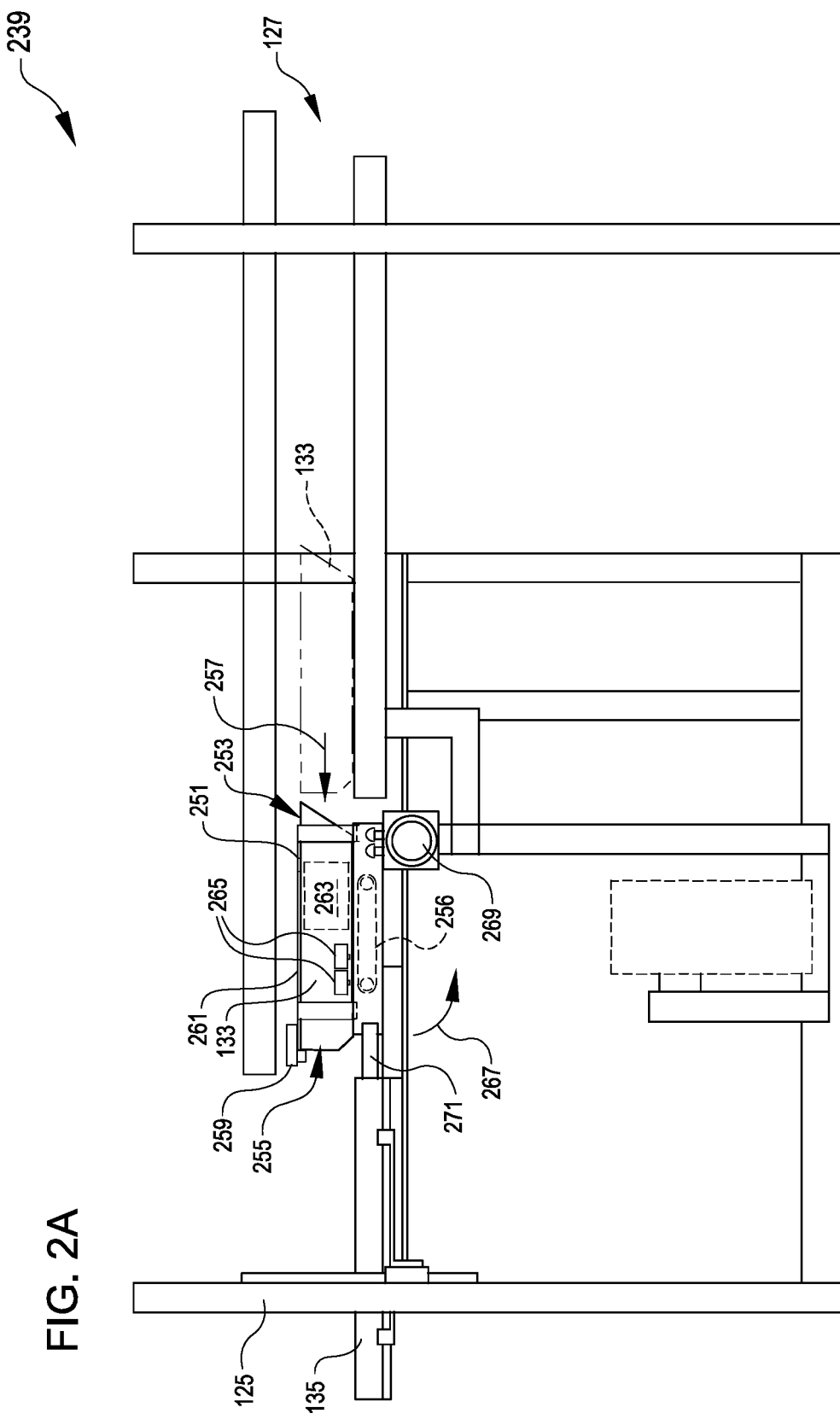

FIG. 2A shows a side view of an example of a dispensing system 239 that may be utilized with the inventory loading system 103 of FIG. 1. The dispensing system 239 may be an example of the dispensing system 139 of FIG. 1.

The dispensing system 239 in FIG. 2A includes a tray holder 251 (hereinafter "holder 251"). The holder 251 can include a cage or other structure suitably sized for receiving a tray 133. For example, the holder 251 may include an open receiving end 253 and an open output end 255. The tray 133 (e.g., under the influence of the tray transport system 127) may move through the open receiving end 253, for example, from the position shown in dashed lines to the position shown in solid lines in FIG. 2A, and/or as depicted by arrow 257. The tray 133 may be received in a recumbent position within the holder 251.

The holder 251 can include or be accompanied by a feeder 256. The feeder 256 may include a suitable roller, belt, or other conveyor capable of moving the tray 133 into, within, and/or out of the holder 251.

The holder 251 can include or be accompanied by a retainer 259. The retainer 259 may retain the tray 133 within the holder 251. For example, the retainer 259 in FIG. 2A is depicted as a retractable extension that can prevent the tray 133 from passing out of the open output end 255 while the extension is an extended state instead of a retracted state. The retainer 259 can include a suitable actuator to allow the movement of the retainer 259 between a state of preventing passage of the tray 133 out of the holder 251 and a state of allowing the tray to move out of the holder 251.

The holder 251 may further include a cover 261. The cover 261 may be positioned over or otherwise obstructing a top of the tray 133 when received in the holder 251. For example, the cover 261 may prevent contents of the tray (such as an item 263) from moving out of the tray 133 through a top of the tray 133 while the tray 133 is received by the holder 251.

Although the tray 133 in FIG. 2A is shown containing a single item 263, in some embodiments, the tray 133 may be additionally or alternatively utilized to contain or carry multiple items 263. The items 263 may be goods or inventory stored in a warehouse environment and purchasable by a purchaser. In various embodiments, the items 263 may be ordered by a purchaser through an online portal. For example, the items 263 may be or include a plastic action figure, a dog toy, or a watch purchased through the online portal. The item 263 can be retrieved from the warehouse environment, transported to and/or by the inventory loading system 103, and deposited into the packaging system 105 so that a package can be completed and sent (or otherwise transported) to the purchaser for delivery of the item in fulfillment of the purchase.

The holder 251 may include or be accompanied by guides 265. For example in FIG. 2A the guides 265 are depicted as rollers, although any other suitable structure for guiding the tray 133 and/or sides of the tray 133 into, within, and/or out of the holder 251 may be utilized. In some embodiments, the guides 265 may be powered or capable of imparting motion for moving the tray 133 relative to the holder 251, for example, as a supplement or substitute for the feeder 256 and/or elements of the tray transport system 127.

The holder 251 may be capable of pivoting, e.g., downwards such as at arrow 267. For example, the holder 251 can be hingedly attached to the support frame 125. In some embodiments, the holder 251 may be temporarily maintained or otherwise prevented from pivoting by other structure. For example, in FIG. 2A, the holder 251 is shown releasably retained by a latch 271 formed as an extendable shaft, although the dispensing system 239 may utilize any other form of latch 271 that can be released to allow the holder 251 to rotate, e.g., under the effect of gravity and in response to the weight of the holder 251, tray 133, and/or item 263. Moreover, although the latch 271 is depicted as extending from a portion of the lift 135, the latch 271 may additionally or alternatively include structure mounted on the frame 125 or other suitable base.

In some embodiments, the holder 251 may be accompanied by or include a motor or other rotational actuator 269 capable of controlling and/or causing rotation of the holder 251. For example, in some embodiments, the rotational actuator 269 may cause or control the rotation depicted by arrow 267. In some embodiments, the rotational actuator 269 may be utilized (e.g., in combination with or in lieu of the latch 271) to retain or maintain the holder 251 in a state for receiving the tray 133. For example, the rotational actuator 269 may cease or reduce an extent of operation to release the holder 251 and allow the holder 251 to fall under the force of gravity, or the rotational actuator 269 may actively rotate the holder 251 downward (e.g., in the direction illustrated by arrow 267). In some embodiments, the rotational actuator 269 may additionally or alternatively be capable of pivoting the holder 251 upwards (e.g., contrary to the direction of arrow 267) to return the holder 251 to a position in which the holder 251 can be maintained by the latch 271 and/or rotational actuator 269. For example, when the latch 271 and rotational actuator 269 are used together, the rotational actuator 269 may be utilized primarily to drive the holder 251 upward until in position for engagement with the latch 271, and the engagement by the latch 271 may reduce an amount of energy that might otherwise be utilized in operating the rotational actuator 269 to keep the holder 251 raised for receiving trays 133.

FIG. 2B shows the dispensing system 239 with the holder 251 pivoted to position the tray 133 in an upended orientation. For example, the holder 251 and tray 133 may reach the state depicted in FIG. 2B as a result of the rotation illustrated by arrow 267 in FIG. 2A. Moving the tray 133 from a recumbent orientation to an upended orientation may position the item 263 at a lower end (e.g., forward end) of the tray 133 and ready for dispensing from the tray 133.

Once in or en route to the upended orientation, a door 273 in the end of the tray 133 may be opened. The door 273 may be positioned in a leading end of the tray 133 that may be arranged to be facing downward in the upended position. The door 273 may be a sliding door. For example, the door 273 may be a door 273 that can slide in tracks within the tray 133. Suitable examples may correspond to doors that have a series of rods or panels interconnected to allow flexibly moving along a curved path. In some embodiments, the door 273 may correspond to a tambour door, e.g., an up-and-over or side closing-opening door, which can be constructed of narrow or wider horizontal slats and "rolls" up and down, or to the side by sliding along vertical or horizontal tracks. Certain examples of suitable elements that may be utilized to form or accompany the door are described in greater detail with respect to FIGS. 3, 3A, 4, and 5 herein.

In use, the door 273 may be opened, for example, moving from the position shown in dashed lines to the position shown in solid lines in FIG. 2B, and/or as illustrated by arrow 275. The door 273 may be opened by suitable components included in or associated with the holder 251. To avoid confusion in the drawings, such components are not shown in FIG. 2B, but are instead obscured by a panel 277. Suitable examples, however, are described herein with respect to FIGS. 6-8, although other options are also possible.

Opening the door 273 may allow the item 263 to fall (e.g., as at arrow 279) out of the tray 133 and into a target volume 281 (e.g., which may correspond to a portion of the insertion system 143) In some embodiments, a distance of such a fall may be adjusted by movement of the tray 133 within the holder 251. For example, the feeder 256 and/or the guides 265 may be operated to advance the tray 133 relative to the holder 251 and thus reduce a size of a drop that may be experienced by the item 263 when the door 273 is opened. The feeder 256 and/or the guides 265 may additionally be operated to pull the tray 133 into the holder 251, for example, to facilitate pivoting away from the upended orientation.

Figure 2C:
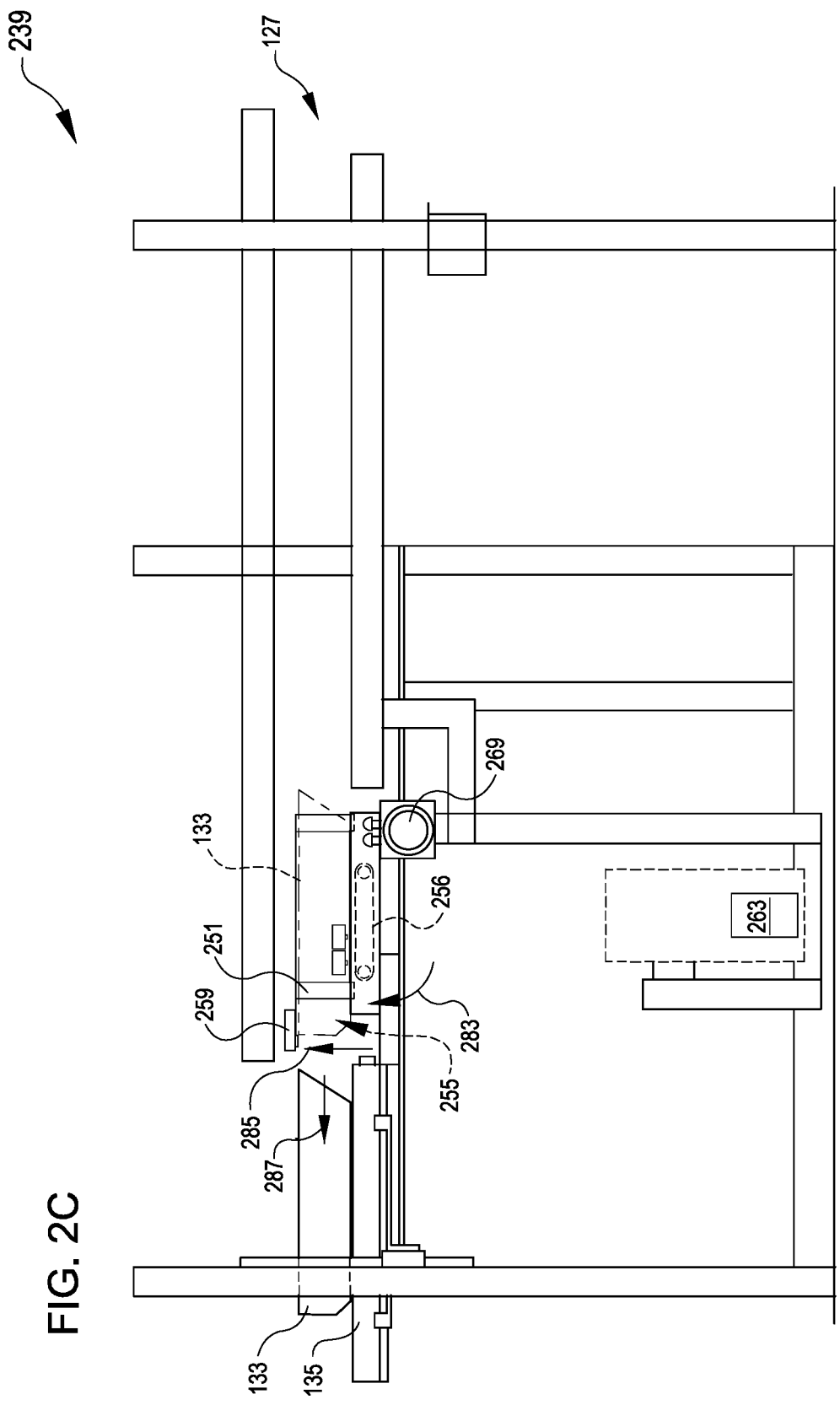

FIG. 2C illustrates the dispensing system 239 with the holder 251 and tray 133 positioned for discharging the tray 133. In operation, the rotational actuator 269 may cause the holder 251 to pivot back upward, for example, as at arrow 283. The retainer 259 may retract or otherwise move (as at arrow 285) into a position that no longer blocks movement of the tray 133 from the open output end 255 of the holder 251. The tray 133 may be discharged from the holder 251 (as at arrow 287), such as in response to operation of the feeder 256. For example, the feeder 256 may move the tray 133 past the retainer 259 and/or onto the lift 135 (e.g., from the position of the tray 133 shown in dashed lines in FIG. 2C to the position of the tray 133 shown in solid lines in FIG. 2C), which may facilitate routing of the tray 133 thereafter by the tray transport system 127.

FIG. 2D illustrates tray 133 in subsequent states to facilitate removal of the tray 133. For example, the lift 135 may raise the tray 133, as at arrow 291 (e.g., from the position of the tray 133 shown in solid lines in FIG. 2C to the position of the tray 133 shown in solid lines in FIG. 2D). Moving the tray 133 by the lift 135 may raise or otherwise relocate the tray 133 to the level of the outbound conveyor 131 of the tray transport system 127. The tray may be moved (e.g., as at arrow 293) from the lift 135 onto the outbound conveyor 131 (e.g., from the position of the tray 133 shown in dashed lines in FIG. 2D to the position of the tray shown in solid lines in FIG. 2D), such as by action of the outbound conveyor 131 and/or other suitable mechanism for such transfer.

Figure 3:
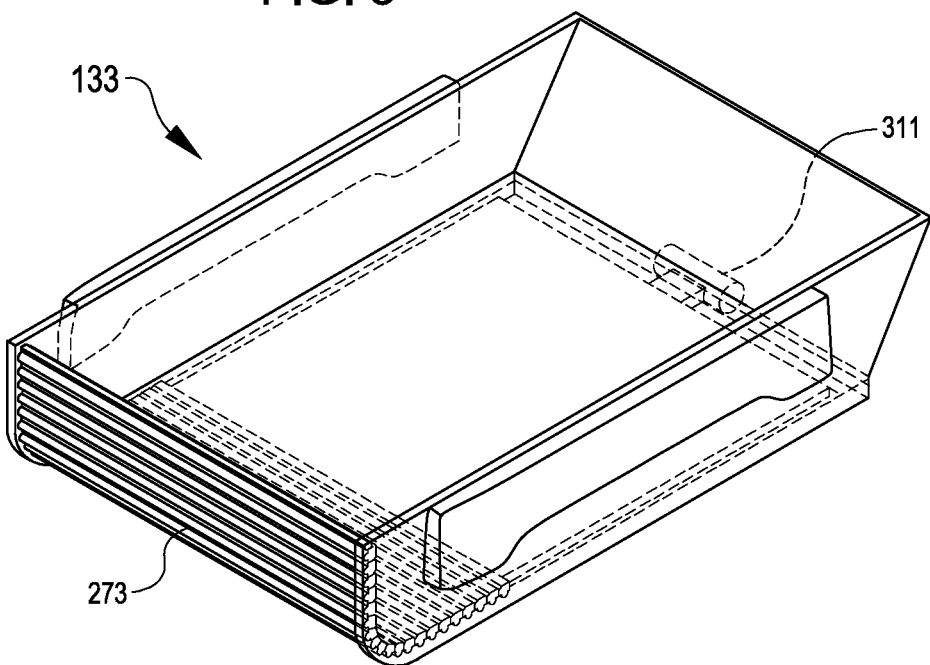
FIG. 3 illustrates a perspective view of an example of a tray that may be utilized in the inventory loading system of FIG. 1, according to various embodiments.

FIG. 3 illustrates a perspective view of an example of a tray 133 that may be utilized in the inventory loading system 101. The tray 133 in FIG. 3 includes a door 273 capable of sliding relative to the body of the tray 133. The door 273 may include or be coupled with a handle 311 that can be manipulated to close and/or open the door 273.

Figure 3A:
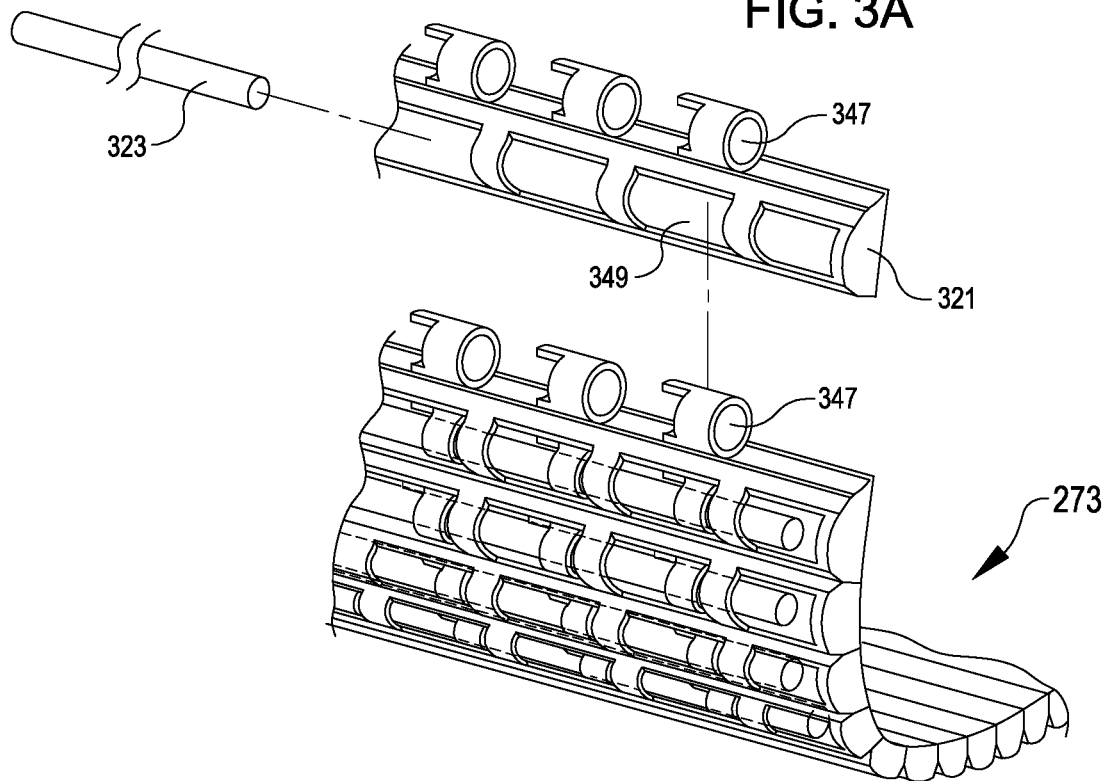
FIG. 3A illustrates a perspective view of an example of elements that may form a door that may be utilized in the tray of FIG. 3, according to various embodiments.

FIG. 3A illustrates a perspective view of elements that may form the door 273. The door 273 in FIG. 3A is formed by panels 321 and rods 323. The panels 321 can have suitable features to allow adjacent panels 321 to be coupled by and rotate about the rods 323. For example, in FIG. 3A, each panel includes a series of eyelets 347 and recesses 349. When the door 273 is assembled, respective recesses 349 of one panel 321 may receive respective eyelets 347 of an adjacent panel 321. A respective rod 323 can be arranged to extend through aligned eyelets 347 and recesses 349 of adjacent panels 321. In some embodiments, the parts of the door 273 may be separately formed and then subsequently assembled, although in some embodiments, the parts of the door 273 may be 3D-printed or otherwise formed within a single manufacturing process that produces components in a state of being at least partially assembled together. The door 273 depicted in FIG. 3A may be an example of a tambour door as described previously. In some embodiments, the panels 321 may include flat tops or other suitable shaping to provide a substantially continuous surface within the tray 133 in a manner that may allow the door 273 to move without generating pinch points that might otherwise grab or catch plastic wrapping or other packaging of items within the tray 133. The panels 321 may additionally or alternatively include undersides that are rounded, narrower than the corresponding tops, and/or otherwise suitably shaped to facilitate pivoting toward and/or away from one another to allow the door 273 to follow a curved path.

FIGS. 4 and 5 illustrate perspective views the tray of FIG. 3 with the door respectively in partially open and fully opened states, according to various embodiments. The door 273 may be capable of sliding in tracks 395 within the tray 133. For example, in response to pulling on the handle 311, the door 273 may slide in the tracks 395 from the closed position depicted in FIG. 3 to the partially opened position depicted in FIG. 4 and subsequently to the fully opened position depicted in FIG. 5. In some embodiments, movement of the door 273 may include movement along a curved path defined by the tracks 395. Movement of the door 273 along such a curved path may be facilitated by elements that form the door 273, such as the panels 321 and the rods 323 described with respect to FIG. 3A.

Figure 6:
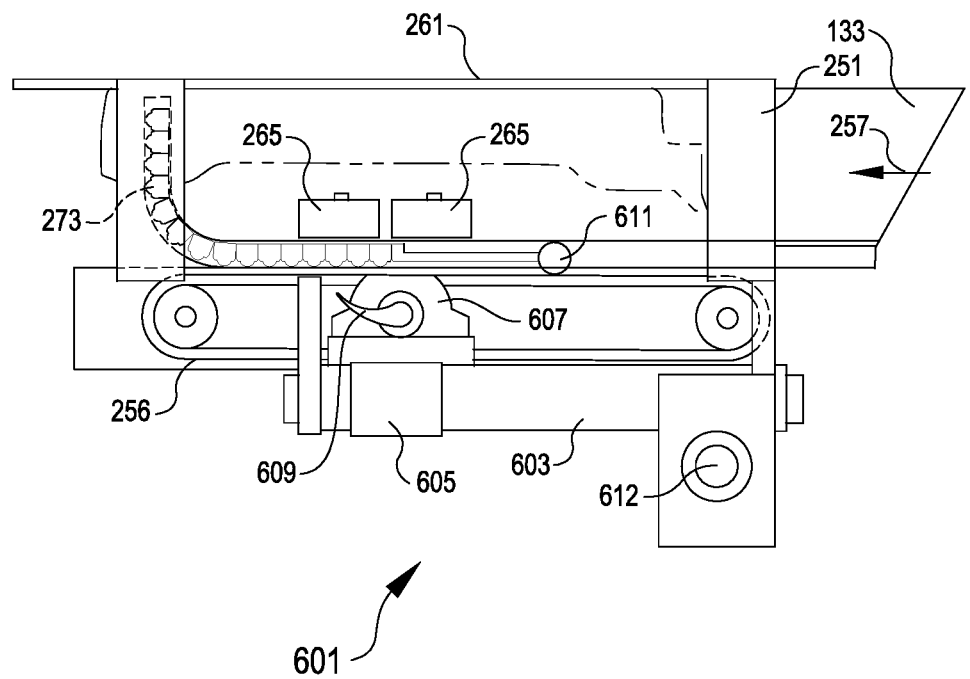
FIGS. 6-8 illustrates an example of a tray holder that may be utilized with the dispensing system of FIGS. 2-5 according to various embodiments.
Figure 7:
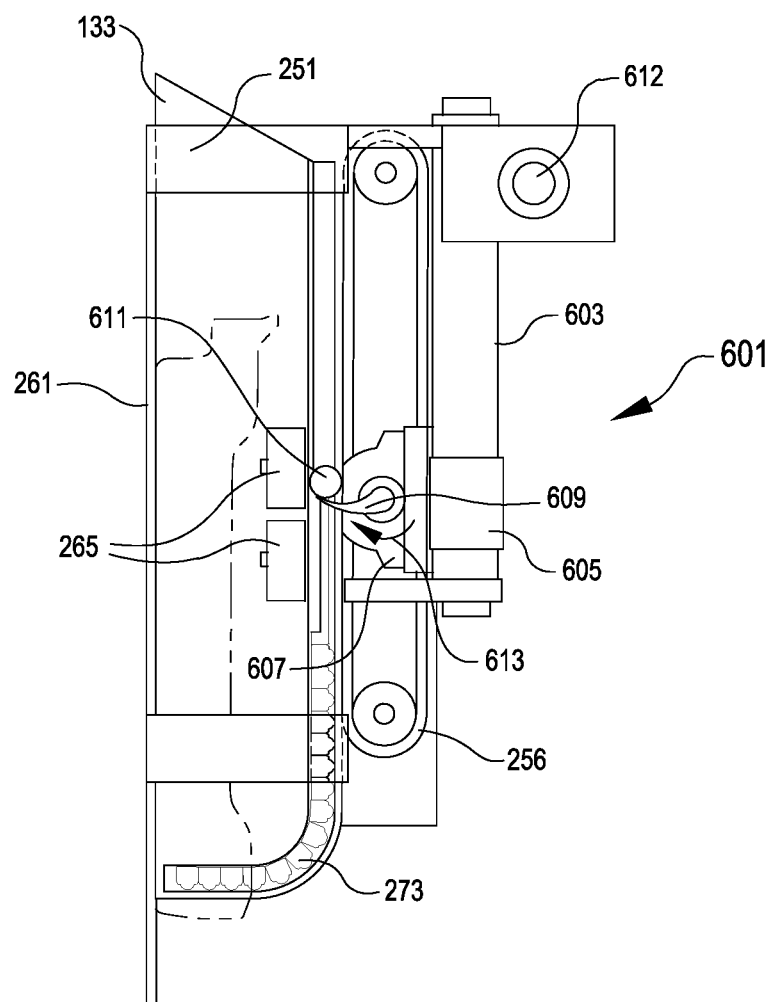
Figure 8:
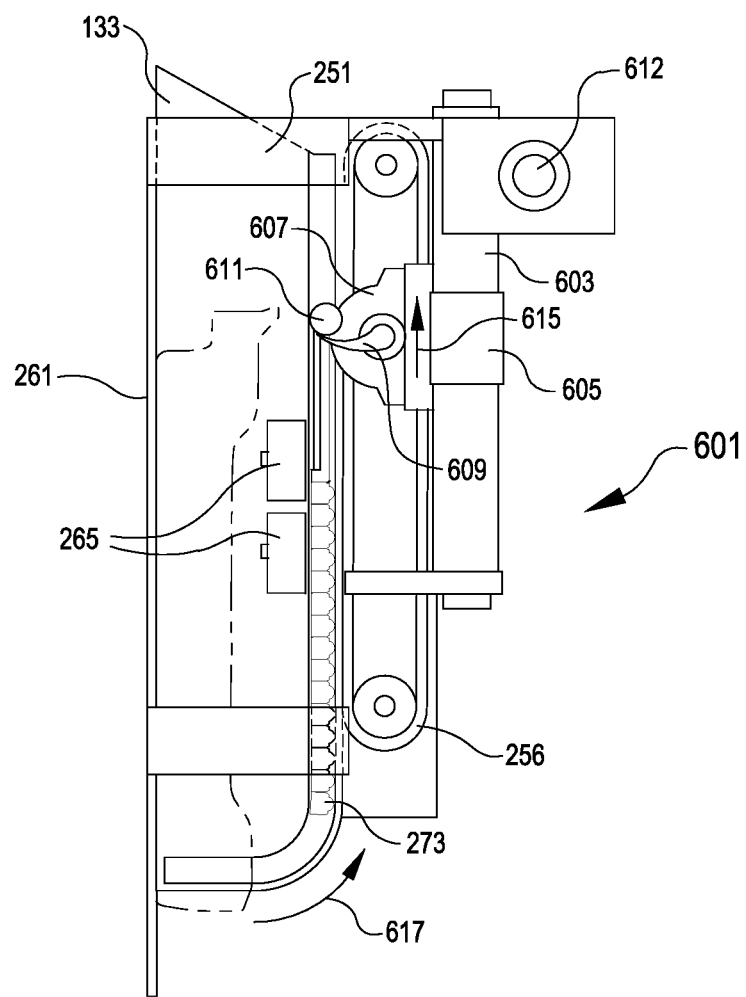

FIGS. 6-8 depict various elements of a door opening system 601 according to various embodiments. The door opening system 601 may be capable of moving the door 273 among positions represented in the various figures. For example, the positions shown in FIGS. 6-8 may correspond to positions shown and/or described with respect to earlier figures herein in some embodiments. For example, FIG. 6 may correspond to an enlarged view of the tray 133 and holder 251 in the recumbent position shown in solid lines in FIG. 2A. Additionally, FIGS. 7 and 8 may each correspond to enlarged views of elements depicted in the upended position in FIG. 2B. For example, FIG. 7 may correspond to an enlarged view of the upended position in FIG. 2B and in particular may reflect the closed position of the door 273 shown in dashed lines in FIG. 2B. Relatedly, FIG. 8 may also correspond to an enlarged view of the upended position in FIG. 2B but in particular may instead reflect the open position of the door 273 shown in solid lines in FIG. 2B. Moreover, FIG. 7 may correspond to the closed state of the door 273 shown in FIG. 3, while FIG. 8 may correspond to the open state of the door 273 shown in FIG. 5.

The door opening system 601 depicted in FIG. 6 includes a linear actuator 603, a base 605, a rotator 607, and a hook 609. The hook 609 may be sized and shaped to interface with a handle 611 of the door 273 (e.g., which may correspond to or be an example of the handle 311 described with respect to FIGS. 3, 4, and 5). Although the handle 611 is depicted as including rod structure in FIG. 6, the handle 611 may include or correspond to any knob, groove, or other structure capable of interacting with the hook 609 or other grabber to impart a force on the door 273 to cause the door 273 to open and/or close. Moreover, although various elements of the door opening system 601 are depicted as coupled with the holder 251, elements of the door opening system 601 additionally or alternatively may be positioned at an suitable location to facilitate opening of the door 273 when the tray 133 is in the upended orientation.

The linear actuator 603 can include a linear bearing or other suitable structure for moving the base 605 in a translational motion relative to the holder 251 and/or tray 133. The base 605 can support the rotator 607. The rotator 607 can rotate the hook 609 between a disengaged state and an engaged state. In operation, as the tray 133 is loaded into the holder 251 (as at arrow 257), the hook 609 may be in the disengaged state. In the disengaged state of the hook 609, the handle 611 of the door may be able to pass over the hook 609 without interference as the tray 133 is loaded into the holder 251 (e.g., as at arrow 257 and/or between the positions of the tray 133 shown in FIG. 2A respectively in dashed line and solid line).

FIG. 7 shows the holder 251 in a pivoted position in which the tray 133 is arranged in the upended orientation (e.g., corresponding to the position in FIG. 2B). For example, the holder 251 may reach the upended orientation in FIG. 7 from the position shown in FIG. 6 by pivoting about a pivot shaft 612 (e.g., under the influence of the rotational actuator 269 and/or in response to operation of the latch 271 described above with respect to FIG. 2A and arrow 267 therein, for example). As may be appreciated with respect to FIG. 7, when the tray 133 is in the upended orientation within the holder 251, the rotator 607 may reposition the hook 609 (e.g., by rotation as at arrow 613) from the disengaged state to the engaged state. Rotating the hook 609 can cause the hook 609 to come into engagement with the handle 611. For example, the hook 609 may wrap at least partially around the handle 611 so that translational movement of the hook 609 can cause a resulting translation or other movement in the handle 611.

FIG. 8 shows the door 273 in an opened position. For example, the linear actuator 603 may move the base 605 along the length of the tray 133 (e.g., as at arrow 615), which can cause the hook 609 to carry the handle 611 of the door along the length of the tray 133 and cause the door 273 to open (e.g., as at arrow 617, which may correspond to the arrow 275 in FIG. 2B). In some embodiments, the linear actuator 603 and/or other elements of the door opening system 601 may apply sufficient force to the handle 611 to overcome resistance to opening that may be provided by friction, a detent, a latch, or other feature that may retain the door 273 in a closed state until acted upon by the door opening system 601.

Multiple options may be available for closing the door 273. In some embodiments, the hook 609 may be rotated out of engagement with the door 273, and the weight of the door 273 may cause the door 273 to slide downward and shut, as in a direction opposite that shown by arrow 617. In some embodiments, the hook 609 may adequately engage the handle 611 such that movement of the linear actuator 603 (e.g., in a direction opposite that illustrated by arrow 615) while the hook 609 is engaged with the handle 611 is sufficient to move the door 273 and handle 611 in a closing direction (e.g., which may correspond to a direction opposite that illustrated by arrow 617) and cause the door 273 to close.

In some embodiments, the door 273 may remain closed when the holder 251 is pivoted downward and/or upward. For example, the door 273 may include a detent, latch, or other mechanism to retain the door 273 in place absent a sufficient force in an opposite direction to pull and/or push the door 273 to an opened state.

Figure 9:
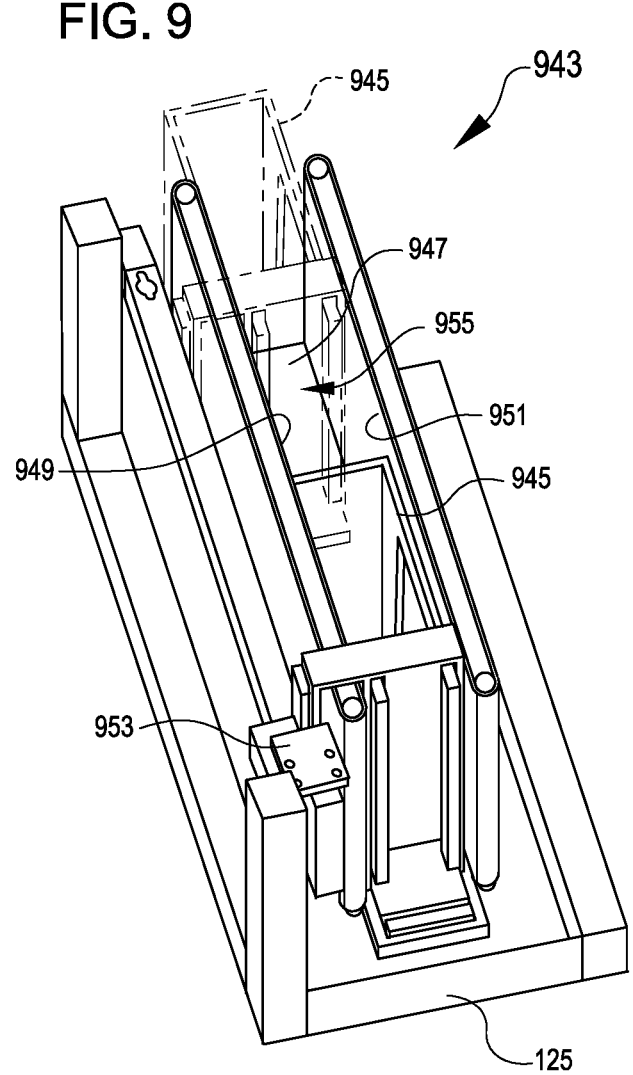
FIG. 9 illustrates a top perspective view of elements of an insertion system that may be utilized in the inventory loading system of FIG. 1, according to various embodiments.

FIG. 9 illustrates a top perspective view of an insertion system 943. The insertion system 943 may be an example of the insertion system 143 of FIG. 1, for example.

The insertion system 943 depicted in FIG. 9 includes a chassis 945, a bottom conveying surface 947, a first side conveying surface 949, a second side conveying surface 951, and a linear actuator 953. Respective conveying surfaces may correspond to belts, bands, or any other form of surface by which conveying can be performed.

One or more elements of the insertion system 943 may be supported by the support frame 125, for example. The insertion system 943 also includes a chamber 955 defined by other components of the insertion system 943. Generally, the linear actuator 953 may drive the chassis 945 between a home position (e.g., shown in solid lines in FIG. 9) and toward an extended position (e.g., is shown in dashed lines in FIG. 9). In some embodiments, in the extended position, at least a portion of the chassis 945 may extend beyond a forward end of the chamber 955.

Figure 10:
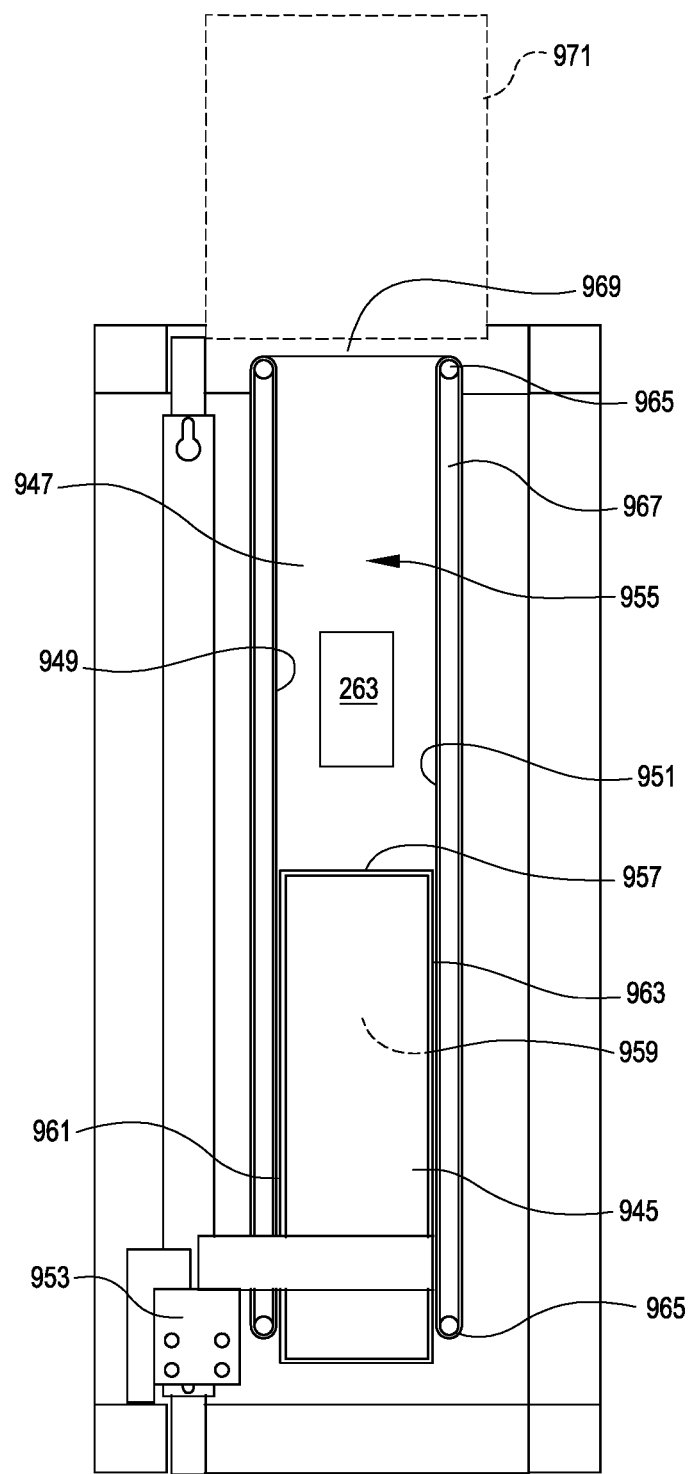
FIGS. 10-12 illustrates a top view of the insertion system of FIG. 9 and shows elements at different stages of use, according to various embodiments.
Figure 11:
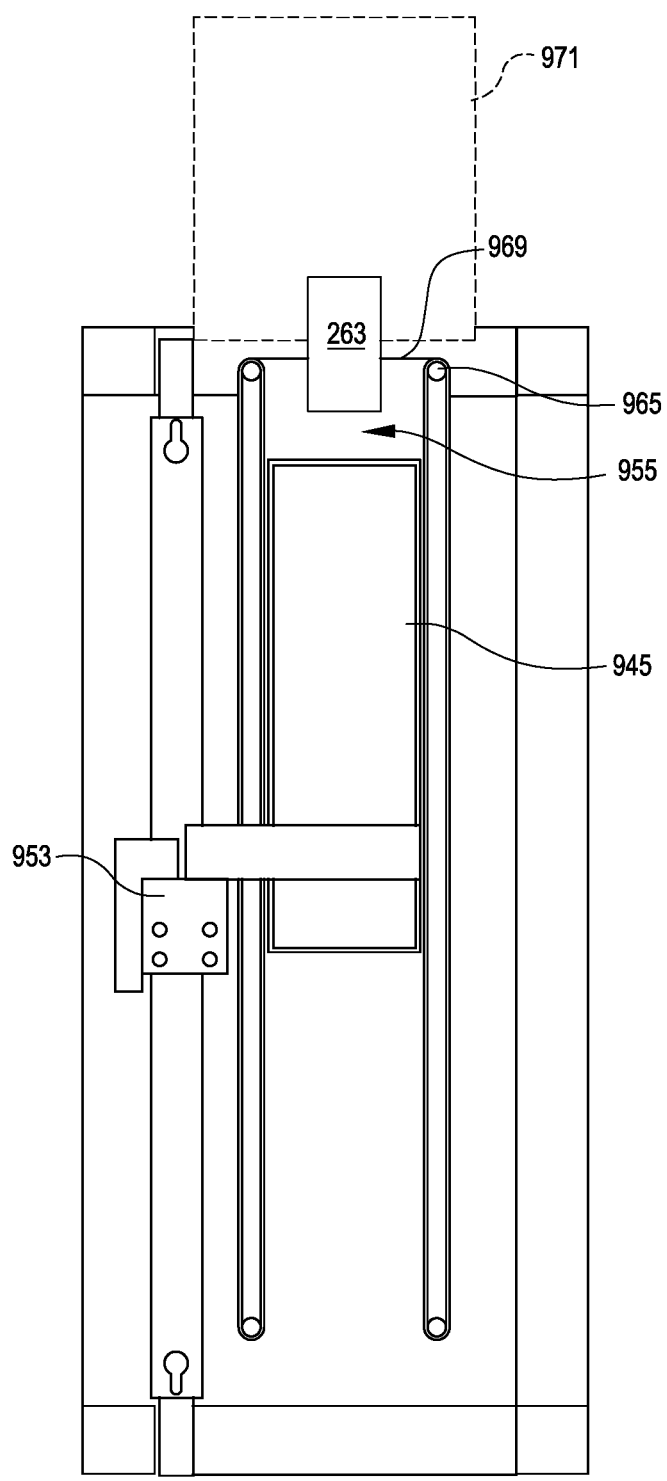
Figure 12:
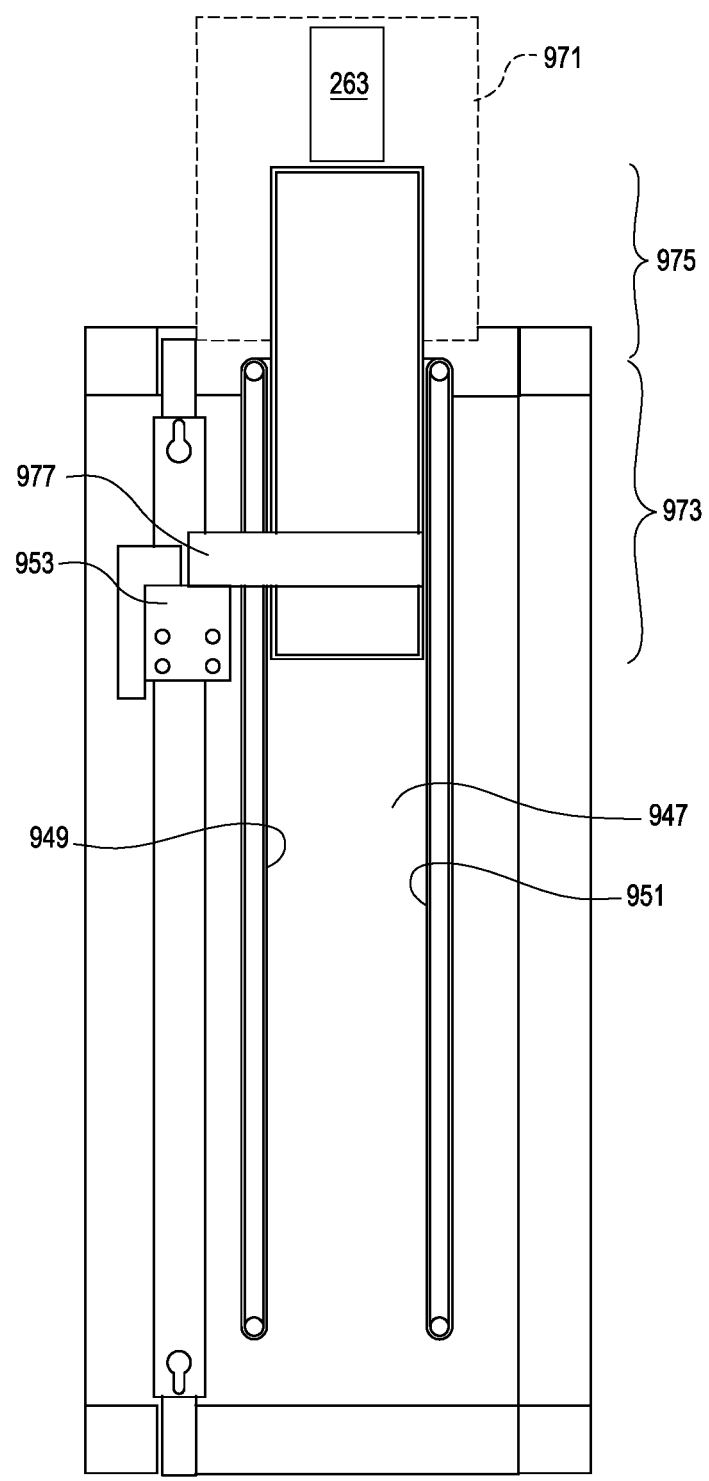

FIGS. 10-12 show top views illustrating different states of the insertion system 143. Various elements of the insertion system 143 may be fastened together. Fastening together may allow relative movement among elements to be minimized. Additionally or alternatively, fastening together may cause elements to move in unison and prevent relative movement among elements that might otherwise be prone to capturing wrapping plastic or other loose parts of items 263 that may be received in the chamber 955.

The chassis 945 may include at least a front face 957, a bottom face 959, a first lateral face 961, and a second lateral face 963. The bottom face 959 of the chassis 945 may be fastened to the bottom conveying surface 947. The first lateral face 961 of the chassis 945 can be coupled to the first side conveying surface 949, while the second lateral face 963 of the chassis 945 can be coupled to the second side conveying surface 951. The fastening may be accomplished by mechanical fasteners, adhesives, or any other bonding or fastening technique. Fastening may allow movement of the chassis 945 to cause or impart movement in other elements fastened thereto. This may allow the linear actuator 953 to move the chassis 945 to impart synchronized movement of the first side conveying surface 949, the second side conveying surface 951, and the bottom conveying surface 947, for example.

In some embodiments, additional structure may be utilized to facilitate movement of constituent elements. For example, rollers 965 may be provided as a surface about which a respective conveying surface (such as the bottom conveying surface 947, first side conveying surface 949, or second side conveying surface 951) may turn or be looped. Guide plates 967 may be included to provide structural guides along which respective conveying surfaces may be moved and/or received.

The chamber 955 may be bounded or defined in some part with respect to other elements of the insertion system 943. For example, the chamber 955 at a rear end or rear wall may be defined at least in part by the front face 957 of the chassis 945. The chamber 955 may be bounded on a bottom and sides respectively by the bottom conveying surface 947, the first side conveying surface 949, and the second side conveying surface 951. A front of the chamber 955 may correspond to a location of rollers 965 or a front end of one or more of the bottom conveying surface 947, the first side conveying surface 949, or the second side conveying surface 951 (e.g., where such conveying surfaces may turn and be looped around the rollers 965). The top of the chamber 955 may be open, which may facilitate the receipt of one or more items 263, such as from the dispensing system 139 in the altitude direction 109.

In operation, the linear actuator 953 may be utilized to move the elements that bound the chamber 955 and advance the item 263 in unison with movement of the chamber 955. The chamber 955 may shrink or reduce in size in response to movement of the linear actuator 953. For example, the size the chamber 955 in FIG. 10 is much smaller than that shown in FIG. 11, where the chassis 945 has been advanced by the linear actuator 953. Movement of the chamber 955 and/or reduction inside of the chamber 955 may cause the item 263 to be transported toward and/or into a receiving zone 971. For example, the receiving zone may be an example of the receiving zone 107.

With reference to FIG. 12, for example, in some embodiments, the chassis 945 can be advanced (e.g., at the end of a stroke) by the linear actuator 953 to extend past a front edge of the chamber 955. The chassis 945 extending past the front end of the chamber 955 may allow the chassis 945 to push an item 263 fully out of the chamber and into the receiving zone 971, such as by pushing the item further into the receiving zone 971 than if merely dropped off an end of the bottom conveying surface 947.

In some embodiments, to facilitate the chassis 945 extending past the front end of the chamber 955, the chassis 945 may be subject to a particular fastening arrangement. The chassis 945 in its forward-backward or depth direction may include a rearward portion 973 and a forward portion 975. The bottom conveying surface 947, the first side conveying surface 949, and the second side conveying surface 951 may be fastened to the chassis 945 in the rearward portion 973 without being fastened to the chassis 945 in the forward portion 975. The chassis 945 being fastened in the rearward portion 973 without being fastened in the forward portion 975 may allow the forward portion 975 to be moved by the linear actuator 953 to a position of extending forward past ends of bottom conveying surface 947, the first side conveying surface 949, and the second side conveying surface 951, for example, to the position shown in FIG. 12.

Upon loading or discharging item 263 into the receiving zone 971, the chassis 945 may be translated anew away from the extended position and back toward the home position to reset the chamber 955 for receipt of subsequent items 263.

In some embodiments, the linear actuator 953 may be positioned alongside the chassis 945. For example, in FIG. 12, the linear actuator 953 is depicted positioned laterally spaced apart from the chassis 945 (e.g., with the first side conveying surface 949 positioned in between the chassis 945 and the linear actuator 953), and a rail 977 extends between and couples the chassis 945 and the linear actuator 953. Positioning the linear actuator 953 alongside the chassis 945 may allow a compact usage of space that may occupy less space than if the linear actuator 953 were instead positioned in front or behind the chassis 945.

Figure 13:
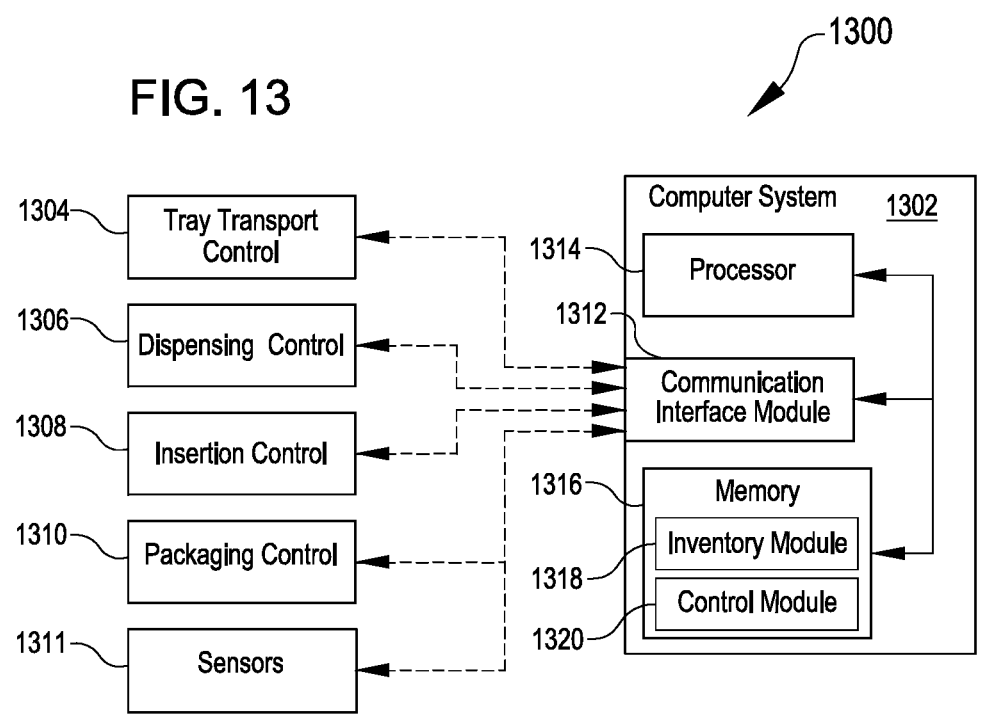
FIG. 13 depicts elements of the control system that may be utilized with other elements described herein, according to various embodiments.

FIG. 13 is a block diagram illustrating control aspects an inventory management system 1300 according to certain embodiments. The inventory management system 1300 may be an example of the inventory management system 101, described elsewhere herein. As shown in FIG. 13, the inventory management system 1300 includes a computer system 1302, a tray transport control 1304, a dispensing control 1306, an insertion control 1308, a packaging control 1310, and sensors 1311. In general, the computer system 1302 may function as a controller that controls other components of the inventory management system 1300, for example, as described further below.

The tray transport control 1304 may correspond to elements capable of adjusting operating parameters of the tray transport system 127. Non-limiting examples may include motors, actuators, or other elements capable of controlling the inbound conveyor 129, the outbound conveyor 131, provision of trays 133, and/or the lift 135.

The dispensing control 1306 may correspond to elements capable of adjusting operating parameters of the dispensing system 139. Non-limiting examples may include motors, actuators, or other elements capable of controlling the retainer 259, guides 265, rotational actuator 269, latch 271, door 273, and/or door opening system 601 (e.g., the linear actuator 603, the rotator 607, the hook 609, and/or the handle 611).

The insertion control 1308 may correspond to elements capable of adjusting operating parameters of the insertion system 143. Non-limiting examples may include motors, actuators, or other elements capable of controlling the linear actuator 953, the rollers 965, the chassis 945, the bottom conveying surface 947, the first side conveying surface 949, and/or the second side conveying surface 951.

The packaging control 1310 may correspond to elements capable of adjusting operating parameters of the packaging system 105. Non-limiting examples may include motors, actuators, or other elements capable of controlling the roll 115, members 117, and/or envelope 119.

The sensors 1311 may include optical sensors, pressure sensors, or any other sensors that may obtain information about items or other elements of the inventory management system 101, which may include information about position, alignment, speed, or any other conditions or state information about components of the inventory management system 101. The tray transport control 1304, the dispensing control 1306, the insertion control 1308, the packaging control 1310, and/or the sensors 1311 may function as appropriate inputs and/or outputs for control of the inventory management system 1300 by the computer system 1302.

The illustrated computer system 1302 includes a communication interface module 1312, a processor 1314, a memory 1316, an inventory module 1318, and a control module 1320. The computer system 1302 may represent a single component, multiple components located at a central location within the inventory management system 1300, or multiple components distributed throughout the inventory management system 1300. In general, computer system 1302 may include any appropriate combination of hardware and/or software suitable to provide the described functionality.

Processor 1314 is operable to execute instructions associated with the functionality provided by computer system 1302. Processor 1314 may comprise one or more general purpose computers, dedicated microprocessors, or other processing devices capable of communicating electronic information. Examples of processor 1314 include one or more application-specific integrated circuits (ASICs), field programmable gate arrays (FPGAs), digital signal processors (DSPs) and any other suitable specific or general purpose processors.

Memory 1316 stores processor instructions, inventory requests, state information for the various components of inventory management system 1300 and/or any other appropriate values, parameters, or information utilized by computer system 1302 during operation. Memory 1316 may represent any collection and arrangement of volatile or nonvolatile, local or remote devices suitable for storing data. Examples of memory 1316 include, but are not limited to, random access memory (RAM) devices, read only memory (ROM) devices, magnetic storage devices, optical storage devices or any other suitable data storage devices.

Communication interface module 1312 facilitates communication between computer system 1302 and other components of inventory management system 1300, including information and/or instructions conveyed between any of the tray transport control 1304, the dispensing control 1306, the insertion control 1308, the packaging control 1310, the sensors 1311, the inventory module 1318, and/or the control module 1320. These communications may represent communication of any form appropriate based on the capabilities of computer system 1302 and may include any suitable information. Depending on the configuration of computer system 1302, communication interface module 1312 may be responsible for facilitating either or both of wired and wireless communication between computer system 1302 and the various components of inventory management system 1300. In particular embodiments, computer system 1302 may communicate using communication protocols such as 802.11, Bluetooth, or Infrared Data Association (IrDA) standards.

In general, the inventory module 1318, the control module 1320, and the communication interface module 1312 may each represent any appropriate hardware and/or software suitable to provide the described functionality. In addition, as noted above, computer system 1302 may, in particular embodiments, represent multiple different discrete components and any or all of the inventory module 1318, the control module 1320, and the communication interface module 1312 may represent components physically separate from the remaining elements of computer system 1302. Moreover, any two or more of the inventory module 1318, the control module 1320, and the communication interface module 1312 may share common components. For example, in particular embodiments, the inventory module 1318 and the control module 1320 represent computer processes executing on processor 1314 and communication interface module 1312 comprises a wireless transmitter, a wireless receiver, and a related computer process executing on processor 1314.

The inventory module 1318 may determine conditions present in the inventory management system 1300, track inventory requests, and/or determine objectives for the inventory management system 1300. For example, the inventory module 1318 may determine (e.g., based on an optical sensor) which items are in which trays 133. The inventory module 1318 may also determine targets (e.g., a target item within a particular tray, a target tray having a particular item, a target station or receptacle designated to receive a target item from a target tray). The inventory module 1318 may also determine the state of other elements within the inventory management system 1300, such as a speed or orientation of a particular element within or utilized by the tray transport control 1304, the dispensing control 1306, the insertion control 1308, the packaging control 1310, and/or the sensors 1311.

The control module 1320 may control components within the inventory management system 1300. For example, the control module 1320 may send commands to the tray transport control 1304, the dispensing control 1306, the insertion control 1308, the packaging control 1310, and/or the sensors 1311 to control respective components of the inventory management system 1300. In various embodiments, the control module 1320 may control components based on information provided by the inventory module 1318. For example, based on designated targets and relative location of those targets identified by the inventory module 1318, the control module 1320 may activate respective components to cause an item to be routed and transferred or otherwise operated upon by constituent elements of the tray transport control 1304, the dispensing control 1306, the insertion control 1308, the packaging control 1310, and/or the sensors 1311. The control module 1320 may implement other changes based on the inventory module 1318 determining other actions may be warranted to move other elements to suitable locations (such as adjusting a speed, orientation, or other state of elements of the inventory management system 1300 to achieve a particular goal). Illustrative examples may be appreciated with respect to FIG. 14, for example.

FIG. 14 illustrates a process 1400 that may be performed by elements of the inventory management system 1300. Some or all of the process 1400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At act 1405, the process 1400 may include receiving a tray. This may correspond to the tray 133 being received by the tray transport system 127 and/or by the holder 251. For example, the control module 1320 may control the inbound conveyor 129, the feeder 256, and/or the guides 265 to cause movement to load the tray into the holder 251.

At act 1410, the process 1400 can include pivoting the holder. For example, this may correspond to the control module 1320 controlling the rotational actuator 269 to rotate and move the holder 251 from a position in which the tray 133 is positioned in a recumbent orientation to a position in which the tray 133 is positioned an upended position. In some embodiments, pivoting at 1410 can include or be preceded by the control module 1320 unlatching the latch 271, e.g., to allow the tray 133 to move within the holder 251 from the recumbent to the upended orientation.

At act 1415, the process 1400 can include engaging a handle for a door. For example this can correspond to the control module 1320 controlling the rotator 607 to cause the hook 609 to engage the handle 611 of the door 273.

At act 1420, the process 1400 may include translating or otherwise moving the door handle. For example, this may correspond to the control module 1320 controlling the linear actuator 603 to cause the base 605 to translate relative to the tray 133 so that the hook 609 borne by the base 605 also moves and causes a corresponding translation of the door handle 611 engaged with the hook 609.

At act 1425, the process 1400 may include opening the door. The door 273 may open in response to the act at 1420. For example, moving the door handle at act 1420 may overcome a resistance that may be present from friction, a detent, or other mechanism that may secure the door 273 in a shut state. Opening the door 273 may allow an item 263 to drop from the tray 133 and into elements of the insertion system 143.

At act 1430, the process 1400 may include closing the door. For example, this may correspond to the control module 1320 controlling the rotator 607 to rotate the hook 609 to disengage the door handle 611 and allow the door 273 to close under its own weight. Alternatively, the hook 609 may remain engaged with the door handle 611, and the control module 1320 may control the linear actuator 603 to move (e.g., translate) the hook 609 and engaged handle 611 to cause the door 273 to move (e.g., within a track in the tray 133) into a closed position.

At act 1435, the process 1400 may include disengaging the door. This may entail the door opening system 601 disengaging the door 273. For example, the control module 1320 may control the rotator 607 to rotate the hook 609 out of engagement of the handle 611, which may facilitate subsequent movement of the tray 133 without interference by the hook 609.

At act 1440, the process 1400 can include pivoting the holder. The pivoting at act 1440 may involve pivoting in an opposite direction from the pivoting at act 1410. For example, if the pivoting at act 1410 is downward, the pivoting at act 1440 may be upward and back toward an earlier position of the holder 251. The pivoting at act 1440 may correspond to the control module 1320 controlling the rotational actuator 269 to raise the holder 251 or otherwise return the holder 251 from a position in which the tray 133 is in an upended orientation and into a position in which the tray 133 is in a recumbent orientation.

At act 1445, the process 1400 may include securing the holder. For example, this may include the control module 1320 controlling the latch 271 to engage the holder 251 and retain the holder 251 in a position in which the tray 133 is in a recumbent orientation and/or otherwise ready for discharge from the holder 251.

At act 1450, the process 1400 can include releasing the tray 133. For example, this may correspond to the control module 1320 controlling the retainer 259 to retract or otherwise move out of the way of the tray 133, e.g., to allow or facilitate movement of the tray 133 through the open output end 255 of the holder 251.

At act 1455, the process 1400 may include discharging the tray. For example, this may correspond to the control module 1320 controlling the feeder 256, the guides 265, and/or an element of the tray transport system 127 to move the tray 133 out of the feeder 256 and/or onto the lift 135 or other portion of an outbound conveyor 131. The act at 1455 may include the control module 1320 controlling the lift 135, causing the tray 133 to move from the lift 135 to the outbound conveyor 131, and/or causing the outbound conveyor 131 to operate for removing the tray 133. In some examples, the discharge of the tray 133 at 1455 may correspond to using elements in the tray transport system 127 that may have the inbound conveyor 129 and the outbound conveyor 131 in alignment on the same plane or arranged otherwise than the particular manner depicted in FIG. 1.

In some embodiments, acts described herein may be performed in parallel or in a different order than depicted in FIG. 14. For example, in some embodiments, the act at 1430 of closing the door and/or the act at 1435 of disengaging the door may occur at least partly prior to, in parallel with, and/or after other actions, such as the pivoting at act 1440, securing at act 1445, and/or release at 1450 and still achieve a suitable outcome in which the hook 609 is at a suitable location to avoid interfering with the tray 133 during discharge at act 1435 and/or during receipt at 1405 of a new tray into the holder 251 for a subsequent cycle.

As noted previously, the act 1425 of opening the door may allow items to drop out of the tray. In some embodiments, items dropping out of the tray may be received by another element or set of elements within the process 1400. For example, the process 1400 may continue with a portion that continues from act 1425 and continues at act 1460.

At act 1460, the process 1400 can include receiving an item into a chamber. This may entail receipt by an insertion system 143, such as receipt into the chamber 955 of the insertion system 943. The receipt may result from items falling in an altitude direction from the dispensing system 243 or 143 into the chamber 955 of the insertion system 943, for example.

At act 1465, the process 1400 can include translating a chassis. For example, this may correspond to the control module 1320 controlling the linear actuator 953 to move the chassis 945 relative to the support frame 125 and/or the chamber 955. Translation of the chassis 945 may cause other elements to move in unison with the chassis 945.

At act 1470, the process 1400 may include advancing conveying surfaces. The conveying surfaces may correspond to boundaries of the chamber 955. The advancing at act 1470, for example, may be a result of the bottom conveying surface 947, the first side conveying surface 949, and the second side conveying surface 951 attached with the chassis 945 moving in unison with the chassis 945 or having motion imparted by movement of the chassis 945.

At act 1475, the process 1400 can include discharging the item from the chamber. For example, this can include the item 263 being moved out of the chamber 955 and into a receiving zone 971. Movement out of the chamber 955 may be caused by movement and/or shrinking of the chamber 955 in response to the translation of the chassis 945 at act 1465 and/or advancing of the chamber 955 and/or conveying surfaces at 1470.

In some embodiments, discharging the item 263 from the chamber 955 at act 1475 can include the chassis 945 moving or extending beyond a front end 969 of the chamber 955. For example, such movement or extension may push the item 263 into the receiving zone 171. Such movement or extension may be in response to the linear actuator 953 being controlled by the control module 1320, for example.

At act 1480, the process 1400 may include re-setting the insertion system. For example, this may entail the control module 1320 controlling the linear actuator 953 to pull or otherwise move the chassis 945 back toward the home position. Movement of the chassis 945 may prepare the chamber 955 for receiving subsequent items 263. Additionally or alternatively, movement of the chassis 945 may retract the chassis 945 away from a state of extending out of the chamber 955 and away from a position that might otherwise occupy a portion of the receiving zone 107 or might otherwise interfere with operation of the packaging system 105.

At act 1485, the process 1400 may include packaging the item. For example, the act 1480 may correspond to the control module 1320 controlling the packaging system 105 to seal the item 263 inside packaging once received within the receiving zone 1907 from the insertion system 143.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory loading system comprising an insertion system, the insertion system comprising:
    a chassis having at least a front face, a first lateral face, a second lateral face, and a bottom face;
    a bottom conveying surface fastened to the bottom face of the chassis;
    a first side conveying surface fastened to the first lateral face of the chassis;
    a second side conveying surface fastened to the second lateral face of the chassis;
    a chamber having bounds defined by the bottom conveying surface, the first side conveying surface, and the second side conveying surface, wherein the first side conveying surface and the second side conveying surface are spaced apart from one another to define a top opening of the chamber through which one or more items are loadable into the chamber, and wherein a rear wall of the chamber is defined at least in part by the front face of the chassis; and
    a linear actuator coupled with the chassis to move the chassis from a home position and toward an extended position so as to advance the bottom conveying surface, the first side conveying surface, and the second side conveying surface along with the rear wall of the chamber to decrease a size of the chamber and advance contents of the chamber in a depth direction toward a receiving zone.

2. The inventory loading system of claim 1, wherein the chassis in the depth direction includes a rearward portion and a forward portion, wherein the bottom conveying surface, the first side conveying surface, and the second side conveying surface are fastened to the chassis in the rearward portion without being fastened to the chassis in the forward portion.

3. The inventory loading system of claim 2, wherein the chassis being fastened in the rearward portion without being fastened in the forward portion allows the forward portion to be moved by the linear actuator to a position of extending forward past ends of the bottom conveying surface, the first side conveying surface, and the second side conveying surface.

4. The inventory loading system of claim 1, further comprising rollers about which the bottom conveying surface, the first side conveying surface, and the second side conveying surface are looped.

5. The inventory loading system of claim 1, further comprising reinforcing plates positioned within respective loops defined by the bottom conveying surface, the first side conveying surface, and the second side conveying surface.

6. The inventory loading system of claim 1, wherein the linear actuator is arranged for travel alongside the chassis.

7. The inventory loading system of claim 1, further comprising a rail extending between and coupling the chassis and the linear actuator.

8. The inventory loading system of claim 1, wherein the insertion system is included in an inventory loading system that further comprises:
    a support frame extending in an up-down direction, a length direction, and the depth direction;
    a tray transport system comprising one or more conveyors arranged for tray transport relative to the support frame in the length direction; and
    a dispensing system arranged for receipt of a tray from the tray transport system and dispensing tray contents in the up-down direction;
    wherein the insertion system is arranged to receive the one or more items from the dispensing system in the up-down direction for movement of the one or more items in the depth direction toward the receiving zone.

9. The inventory loading system of claim 1, further comprising:
    a support frame extending in an up-down direction, a length direction, and a depth direction;
    a tray transport system comprising one or more conveyors arranged for tray transport relative to the support frame in the length direction; and
    a dispensing system arranged for receipt of a tray from the tray transport system and dispensing tray contents in the up-down direction;
    wherein the insertion system is arranged to receive one or more items from the dispensing system in the up-down direction and move the one or more items in the depth direction toward a receiving zone;
    and wherein the chamber is arranged to receive the one or more items from the dispensing system in the up-down direction.

10. The inventory loading system of claim 9, wherein the receiving zone is defined by a packaging system configured to provide packaging forming an opening oriented to allow insertion in the depth direction.

11. The inventory loading system of claim 9, wherein the chassis is moveable by the linear actuator past an opposite end of the chamber opposite the front face of the chassis.

12. The inventory loading system of claim 9, further comprising:
    the tray; or
    the one or more items.

* * * * *